United States Patent [19]

Zandel et al.

[11] Patent Number: 4,566,372
[45] Date of Patent: Jan. 28, 1986

[54] PRESSURE SEAL FOR ULTRA-HIGH PRESSURE APPARATUS

[75] Inventors: Adam Zandel, Forest Hills; Alexander Zeitlin, White Plains, both of N.Y.

[73] Assignee: A. Zeitlin & Associates, Mamaroneck, N.Y.

[21] Appl. No.: 407,426

[22] Filed: Aug. 12, 1982

[51] Int. Cl.⁴ .............................................. F16J 15/18
[52] U.S. Cl. ........................................ 92/168; 92/171; 92/DIG. 1
[58] Field of Search ...................... 92/165 R, 167, 168, 92/171, DIG. 1, DIG. 2, 127, 182; 277/27, 3, 50, 178; 403/259, 260, 373, 345

[56] References Cited

U.S. PATENT DOCUMENTS

| | | | |
|---|---|---|---|
| 1,063,790 | 6/1913 | Greaves | 403/259 |
| 2,565,701 | 8/1951 | Stewart | 277/50 |
| 2,641,514 | 6/1953 | Hecker | 92/DIG. 1 |
| 3,055,668 | 9/1962 | Ragland et al. | 277/129 |
| 3,070,070 | 12/1962 | Trevor | 92/168 |
| 3,156,475 | 11/1964 | Gerard et al. | 277/173 |
| 3,514,113 | 5/1970 | Weiswurm | 92/168 |
| 3,565,446 | 2/1971 | Nyberg | 92/182 |
| 3,975,991 | 8/1976 | Nakajima | 92/168 |
| 4,055,107 | 10/1977 | Bartley | 92/168 |
| 4,173,881 | 11/1979 | Rose | 92/167 |
| 4,230,324 | 10/1980 | Derman | 277/27 |
| 4,283,062 | 8/1981 | Catanzaro et al. | 92/168 |

Primary Examiner—Abraham Hershkovitz
Attorney, Agent, or Firm—Ostrolenk, Faber, Gerb & Soffen

[57] ABSTRACT

The cylinder of a fluid actuated, extremely high pressure ram has an insert in its interior surface which carries a packing seal. The interface between the insert and the cylinder portion which receives the insert can also receive the pressurizing fluid which operates the ram so that the insert inner diameter will not change as the fluid pressure is increased to operate the ram and so that the gap between the interior diameter of the insert and the ram will not change even though the main cylinder body has its interior diameter increased due to the ram operating pressure.

8 Claims, 4 Drawing Figures

PRESSURE SEAL FOR ULTRA-HIGH PRESSURE APPARATUS

BACKGROUND OF THE INVENTION

This invention relates to hydraulic cylinder seals and more particularly to a novel seal structure especially adapted for use in large diameter high pressure hydraulic cylinders.

Hydraulic presses are well known for use in forging, extrusion, deep drawing and the like. Such hydraulic presses employ a ram member supported in a cylinder and driven by a fluid under pressure to exert force on the material being formed. Oil is commonly used as the pressure fluid for operating the ram and the oil may be at a pressure of 10,000 pounds per square inch. Hydraulic presses of this general type are shown in U.S. Pat. No. 2,997,353 to A. Zeitlin et al and U.S. Pat. No. 3,156,475 to Gerard et al.

Very large hydraulic cylinders which must contain extremely high fluid pressures may expand or "breathe" up to 0.002 or more inches for each inch of diameter of the cylinder. For a forging press having a capacity of 200,000 tons, the ram cylinder may have a diameter of 100 inches. A 100-inch diameter cylinder can increase its diameter as much as 0.2 inch with an internal pressure of about 10,000 p.s.i. This would then increase the gap between the interior diameter of the cylinder and the outer diameter of the ram received by the cylinder by 0.1 inch or more, depending on the ram design. The dynamic seal which is used between the ram and the cylinder wall for containing the high pressure fluid cannot easily bridge the gap when it is increased by 0.1 inch and the seal can extrude into the gap, thereby decompressing the cylinder and making the machine inoperable.

Dynamic seals which have been used are of many different types and, for example, can be of rubber, steel or fabric having impregnated asbestos therein. The seals can have the shape of a V-ring or O-ring, or the like.

Above noted U.S. Pat. No. 3,156,475 to Gerard et al describes the problem of expansion of the cylinder in very high pressure hydraulic presses and the loss of the seal to the ram under this condition. Gerard et al propose a seal fastened to the end of the ram and by a support ring. The ring is caused to expand and contract with the cylinder to maintain a seal to the cylinder, even though the cylinder breathes. The design of structures of this type is complicated by requiring a secondary seal between the seal-carrying ring and the ram and by requiring a ring design which will expand in a manner to track the expansion and contraction of the cylinder wall.

The problem of the expansion of the cylinder wall of a high pressure hydraulic ram-type structure is also referred to in U.S. Pat. No. 4,173,881 to Rose. In that patent, a liner which extends the full length of the cylinder wall. Pressure is applied along the full length of the liner between two input sources which are isolated from one another by a sealing ring between the liner and the cylinder body. This structure relies on its operation for the seal between the auxiliary cylinder liner and the main cylinder body and would fail with the failure of this additional seal.

BRIEF DESCRIPTION OF THE INVENTION

In accordance with the present invention, a novel seal holder insert ring is fixed to the main cylinder. The main sliding seal is fixed to the interior diameter of the insert ring and makes a sealed sliding connection to a ram of simple surface geometry. Fluid passages are provided through the seal holder to permit the high pressure fluid which operates the ram to be communicated to the outer diameter of the seal holder and to an annular space between the seal holder and the main cylinder wall. Consequently, as the extremely high pressure applied to the interior of the main cylinder changes, the cylinder body will expand or contract in diameter. However, the seal holder which has a substantially reduced differential pressure across its inner and outer surfaces will not change in dimension and hoop stress will not be applied to the seals which maintain a constant dimension relative to the outside diameter of the hydraulic ram.

The novel seal holder structure is held in place on the cylinder by a gland ring which is clamped atop the cylinder end and the corresponding end of the seal holder. Suitable O-ring seals are placed between the gland ring and the seal holder and between the gland ring and the cylinder to form a necessary seal for fluid which bleeds into the annular region between the outer diameter of the seal holder and the inner diameter of the cylinder.

Accordingly, a simple and extremely effective structure is completed for ensuring against the loss of the pressure seal or the extrusion of the seal body of an extremely high pressure hydraulic cylinder. The seals can be easily maintained and replaced if necessary simply by unbolting the gland ring and removing the seal holder from its location within the cylinder.

DETAILED DESCRIPTION OF THE DRAWINGS

Figure 1:
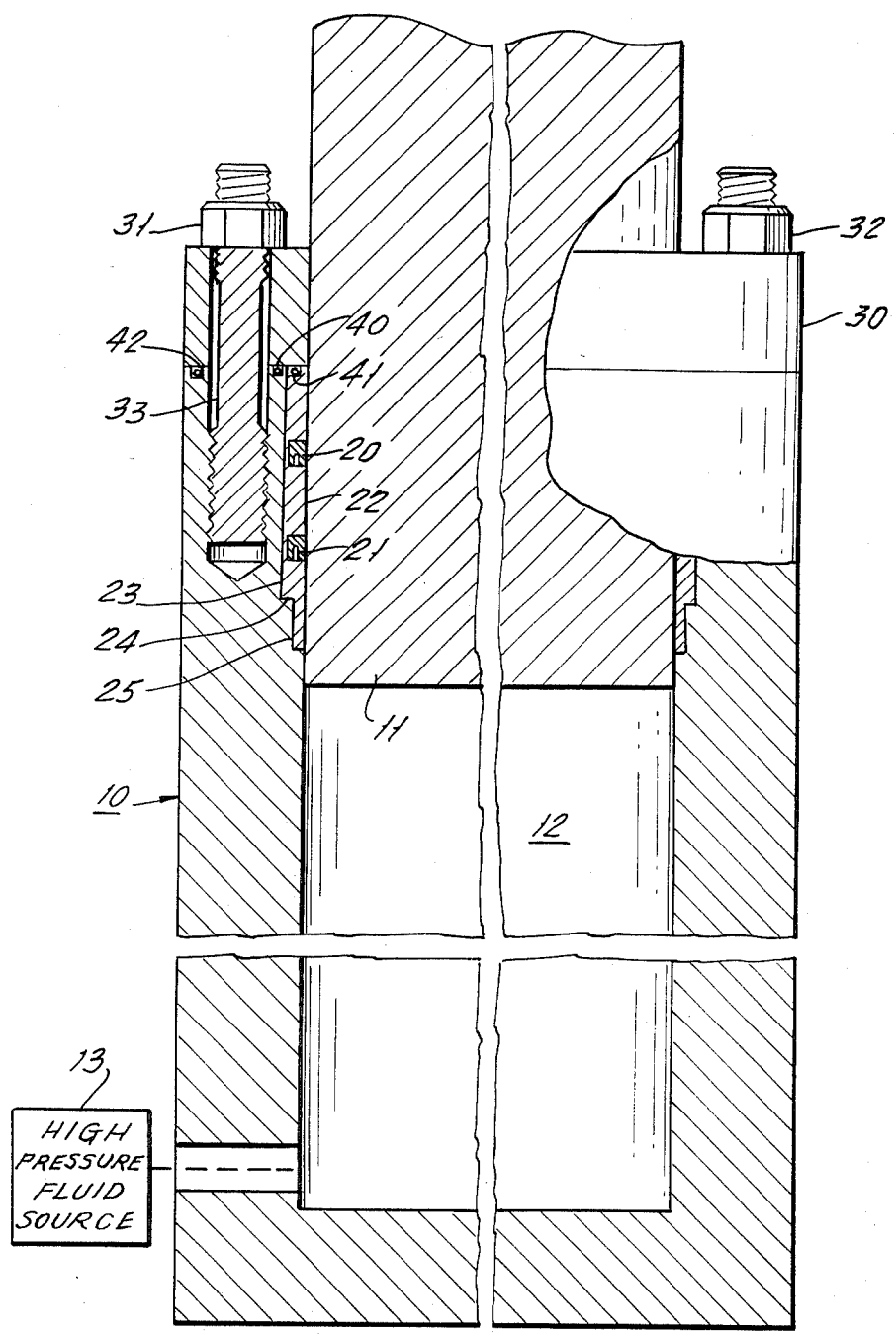
FIG. 1 is a drawing partially in cross-section of a high pressure cylinder and its ram which employ a novel compensating seal constructed in accordance with the invention.
Figure 2:
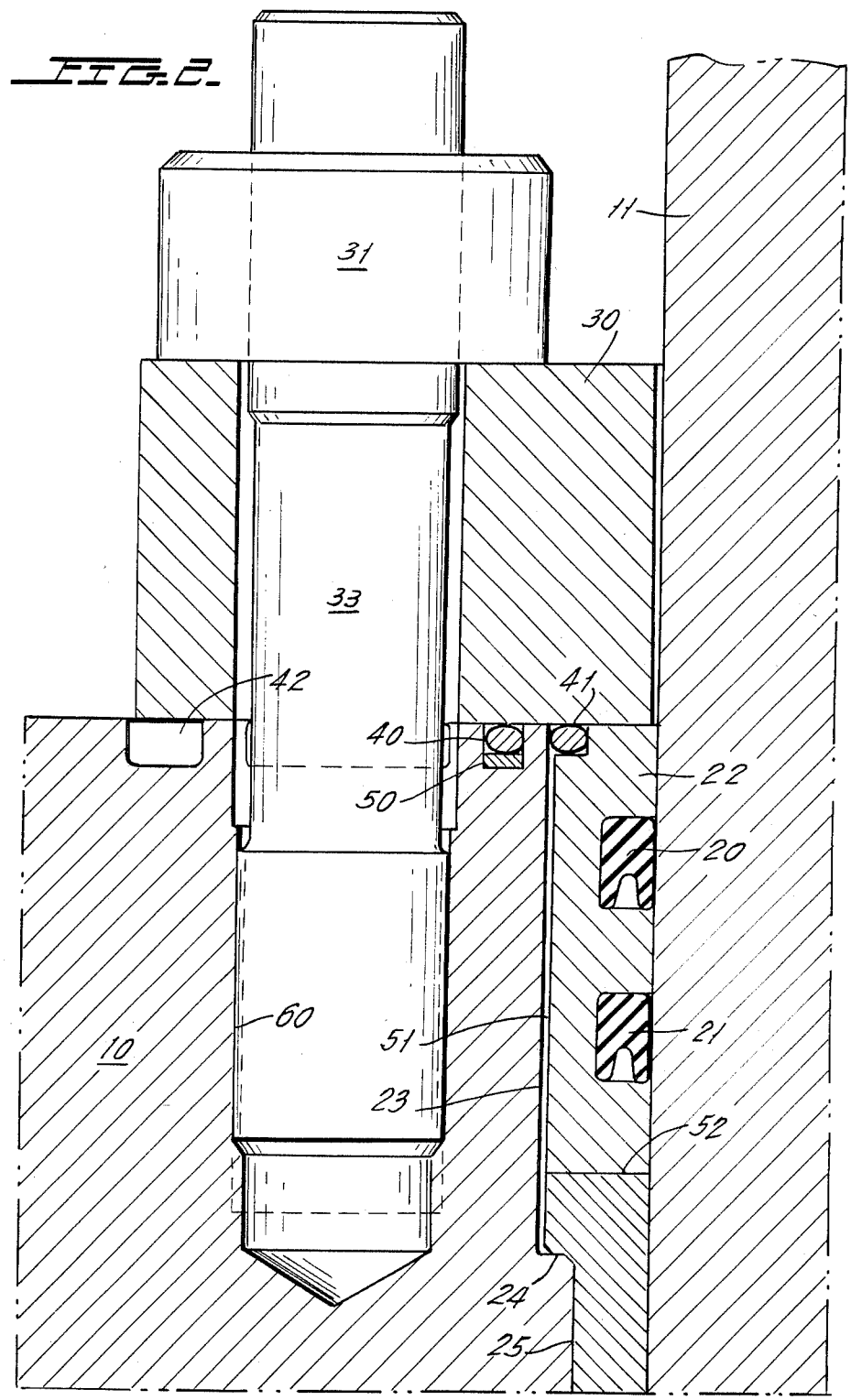
FIG. 2 is an enlarged cross-section of a portion of FIG. 1 to illustrate the novel compensating seal of the present invention.

Referring to FIGS. 1 and 2, there is shown a hydraulic cylinder 10 which may be of steel and may have an inner diameter in excess of 100 inches and a wall thickness of about 10 inches and a length of about 200 inches. A steel ram 11 is received in the interior diameter of cylinder 10 with a clearance of about 0.050 inch. Ram 11 may also be of cast iron. Ram 11 may have a length of 240 inches and typically may have a stroke of 140 inches under the influence of a high pressure fluid which is injected into the cylinder chamber 12 of FIG. 1. The ram 11 can move at a top speed of about 5 inches per second. High pressure fluid such as oil is applied to the interior of chamber 12 as from the high pressure fluid source 13 schematically shown in FIG. 1.

The fluid injected into chamber 12 will have a pressure of approximately 10,000 p.s.i. In order to prevent loss of the hydraulic fluid in chamber 12, it is necessary to place a dynamic seal between the inner wall of cylinder 10 and ram 11. This seal consists, in FIGS. 1 and 2, of the series arranged V-type seals 20 and 21. The V-type seals are conventional chevron packing seals which consist of asbestos impregnated fabric. Other seals can be used having different shapes and made of different material.

In accordance with the invention, a novel seal holder cylinder 22 is provided for receiving the rings 20 and 21. The seal holder 22 may have a length for example of 10 inches and a wall thickness of 2 inches and preferably is of bronze. Seal holder 22 is received is increased diameter region 23 of cylinder wall 10 and is located by the annular shoulder 24 between diameter region 23 and reduced diameter region 25. Reduced diameter region 25 may have the same diameter as that of the inner diameter of cylinder 10.

Seal holder ring 22 is fixed in place within the cylinder wall by steel gland ring 20. Gland ring 30 is bolted in place by a ring of nuts including nuts 31 and 32 shown in FIG. 1. These nuts are fixed to elongated double headed bolts such as the bolt 33 which has its upper end received by the nut 31.

Two O-ring seals 40 and 41 are disposed between the tops of cylinder 10 and seal holder 22 and will be later described. An annular channel 42 is formed in the outer rim of the upper end of cylinder wall 10 and engages the gland ring 30 as shown. As is shown in FIG. 2, the O-ring 40 is carried in an enlarged O-ring receiving opening which has a spacer 50 at its bottom.

As shown particularly in FIG. 2, there is an intentional gap 51 between the outer diameter of seal holder 22 and the enlarged diameter portion 23 of cylinder 10. This gap can for example be 0.030 inch and extends to the top of the seal holder 22. A plurality of openings such as opening 52 are formed around the periphery of the seal holder 22 to ensure communication between the fluid contained within the interior of cylinder 10 and the volume defined by the thin annular chamber 23. When the interior volume 12 of FIG. 1 is pressurized with extremely high pressure oil, this pressure will communicate up to the bottom of seal 21 through the clearance between the outer diameter of ram 11 and the inner diameter of the cylinder 10 and into the annular region 23. This pressurized fluid will be prevented by the O-rings 40 and 41 from escaping upwardly beyond the end of the seal holder 22. In accordance with the invention, no matter how high this pressure may be, the same approximate pressure will be applied to the inner and outer diameters of seal holder 22 thereby preventing a change in dimension of its interior diameter and of the pressure of the seals 20 and 21 on the ram 11. Consequently, even though the diameter of the main cylinder body 10 may increase with increased pressure by as much as 0.2 inch, the interior diameter of member 22 remains approximately constant to ensure a good seal to the ram 11.

Moreover, since the seal holder ring 22 does not expand or contract in diameter during pressurized operation, hoop stresses are not be applied to the seals 20 and 21. Note that the seal holder ring 22 is of bronze and is softer than the outside surface of ram 11 which may be either hard chrome plated or, if the ram is of cast iron, its outer surface is chilled during casting. Thus, ring 22 cannot cause gouging of ram 11.

The extremely high pressure which will be applied at the top of the seal holder 22 is easily confined by the static O-ring 41 to prevent leakage of the fluid through the gap between ram 11 and the gland ring 30.

The gland ring bolts such as bolt 33 of FIG. 2 are arranged so that they threadably engage the threaded opening 60 in the cylinder wall 10 at a distance substantially removed from the top of the cylinder wall. For example, the beginning threaded region 60 can be spaced at least 2 inches from the top of the cylinder wall 10 and can have a length of 5½ inches. In this manner, it is ensured that the top of the cylinder is always in compression against the gland ring 30. These compressive stresses are enhanced by making the groove which receives O-ring 40 and spacer 50 deeper than would be necessary for the compression of the O-ring 40 only. Thus, the O-ring 40 will be under compression at all times and will prevent loss of fluid from channel 51 outwardly through the junction between the top of cylinder 10 and the gland ring 30.

In order to further improve the seal between the top cylinder 10 and the gland ring 30, a deep annular channel 42 is formed in the exterior upper surface of cylinder 10 to receive O-ring 40.

The deep channel 42 permits the top of cylinder 10 to be elastically compressed by a distance approximately equal to the extension of bolts 31.

In a 10,000 p.s.i. working pressure cylinder and seal arrangement of dimensions given above, a bolt ring can be formed using 36 bolts arranged in a bolt circle, and each having the structure of bolt 33. Each of the bolts will have a diameter of 3½ inches and hold the gland ring 30 to the top of cylinder 10. The bolts 33 in this example will extend approximately 0.006 inch. To compress the channel section of cylinder 10 by the same amount as the bolt extension, if channel 42 has a depth of 2 inches, it will have to be subjected to a stress of 90,000 p.s.i. If the wall formed by the channel 42 is 3/16ths inch thick, the no-gap condition will then be reached when bolts 33 are pre-tensioned to 42,000 p.s.i. These are acceptable values because high pressure cylinders and bolts are generally made of alloy steel which is heat-treated to 120,000 p.s.i. yield strength. Note, however, that the stresses approach the limits of practical application of present-day materials and the design should be carefully made.

In operation, as the pressure in the cylinder mounts, the bolts such as bolt 33 will extend. The compressed area of the cylinder at its upper edge however is relieved, thereby eliminating the possibility that a gap will be created between the cylinder 10 and the gland ring 30. This prevents the extrusion of O-ring 40 or 41 beneath gland ring 30 by the pressures in channel 51.

Figure 3:
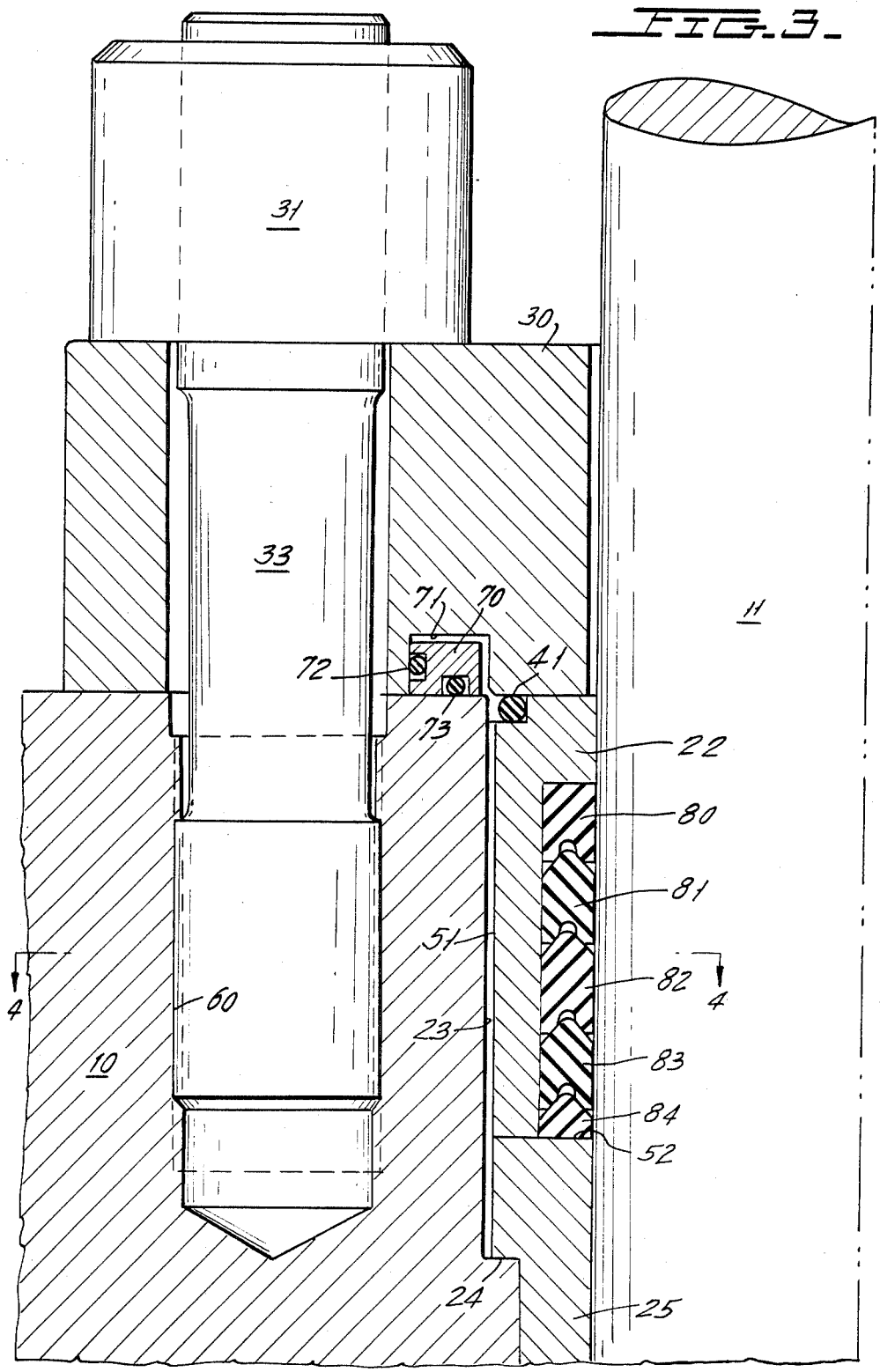
FIG. 3 is a cross-section similar to that of FIG. 2 which shows a second embodiment of the invention.

FIG. 3 shows a second embodiment of the invention wherein components identical to those of FIGS. 1 and 2 have been given the same identifying numerals. The arrangement of FIG. 3 employs a modified seal structure in which seals 20, 21 and 40 of FIG. 2 are replaced by a different seal arrangement.

The seal 40 of FIG. 2 has been replaced, in FIG. 3, by a seal structure similar to that of U.S. Pat. No. 3,223,427 to Gerard et al, dated Dec. 14, 1965, which employs a seal mounting ring 70 which is contained within an annular groove 71 in gland ring 30. Ring 70 carries a first O-ring seal 72 and a second O-ring seal 73. The O-ring seal 72 is compressed between the outer diameter of ring 70 and the outer diameter of the slot 71 to prevent leakage of fluid through the path defined between ring 70 and slot 71. The ring 73 is compressed against the top of cylinder wall 10 and provides the seal which was formerly provided by seal 40. The modified arrangement of FIG. 3 provides an appropriate seal for designs in which the main O-ring such as the O-ring 40 of FIG. 2 cannot be prestressed sufficiently to prevent an unintended gap between the gland ring 30 and the top of cylinder 10 which might result in extrusion of the ring 40 of FIG. 2. The seal structure of FIG. 3 employing the dual seals 72 and 73 avoids this potential problem.

Figure 4:
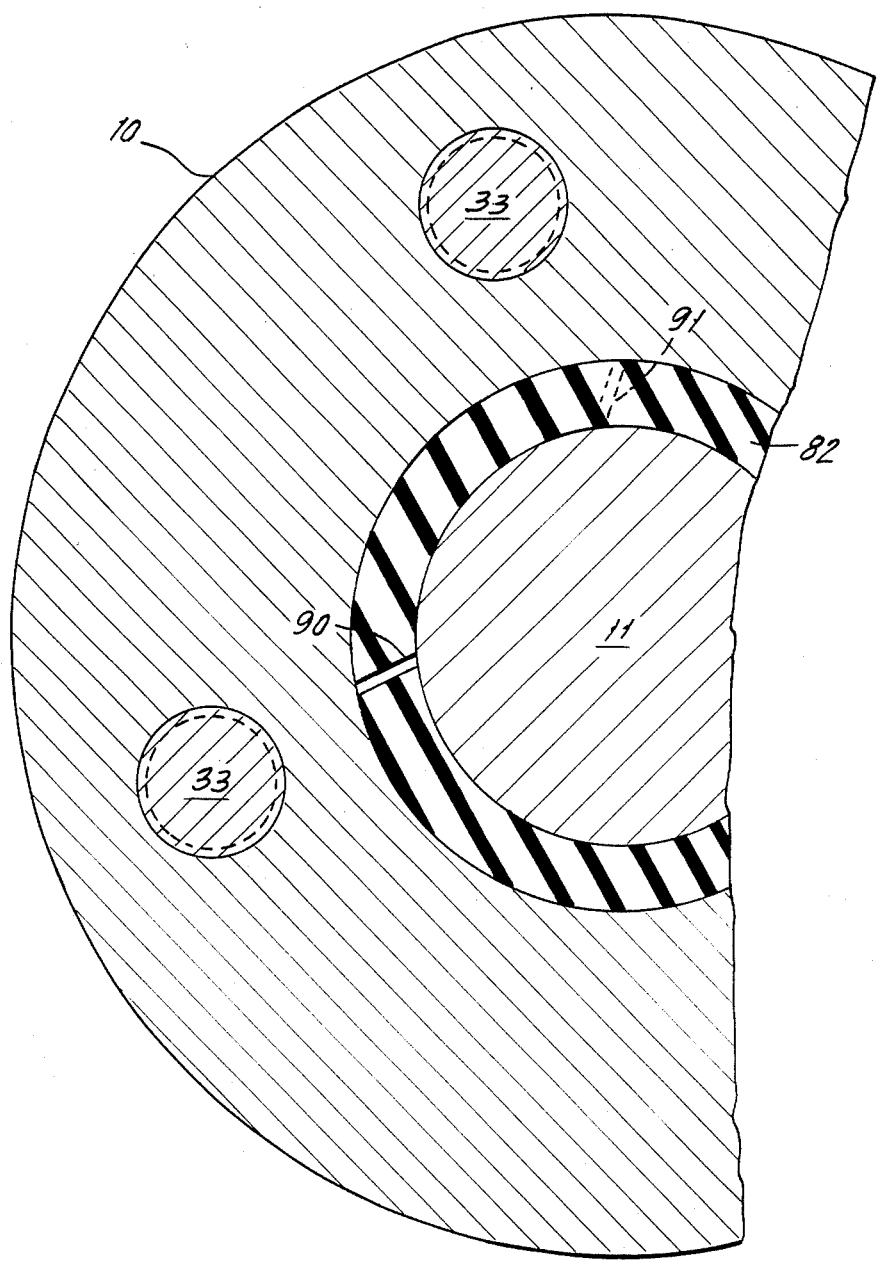
FIG. 4 is a cross-section of FIG. 3 taken across section line 4—4 in FIG. 4.

A second seal modification in FIG. 3 is the arrangement of the stuffing box seals. Thus, the seals 20 and 21 of FIG. 2 have been replaced by a plurality of nested chevron seals 80 to 84. Seals 80–84 are stacked atop one another and adjacent seals are connected to one another along respective annular seal regions. Seals 80–84 have slit sections which permit their being wrapped from an elongated form to the cylindrical form needed when they are nested into one another and into seal holder 22. The slit sections will be conventionally slit on a slant or bias and the slits of the different rings will be staggered relative to one another to eliminate leakage through the parting line of the slits. This arrangement is seen in FIG. 4 where, for example, the chevron ring 82 is cut on a slant at section 90 while the underlying ring 83 is cut on the slant at section 91 which is displaced from the section 90. In a similar manner, each of the slits of each of the rings will be displaced relative to any other of the cuts in the other rings.

This arrangement of the chevron seals 80–84 simplifies the replacement of the seals during periodic maintenance or repair. Thus, in the arrangement shown in FIG. 2, in order to replace the seals, the entire ram 11 must be completely withdrawn from the cylinder. In the arrangement of FIG. 3, however, chevron rings can be more easily replaced and full withdrawal of the ram from the cylinder is not necessary since the seals 80–84 can be wrapped in place after ram 11 is only partly withdrawn.

Although the present invention has been described in connection with a preferred embodiment thereof, many variations and modifications will now become apparent to those skilled in the art. It is preferred, therefore, that the present invention be limited not by the specific disclosure contained herein, but only by the appended claims.

What is claimed is:

1. A compensated seal structure for high pressure hydraulic apparatus which employs a high pressure fluid having a pressure of greater than about 10,000 pounds per square inch and a cylindrical ram having a smooth, elongated, outer surface having a diameter greater than about 100 inches; said hydraulic apparatus comprising said cylindrical ram, a main cylinder which receives said ram in sliding relation and means to apply high pressure fluid to the interior of said main cylinder and to an end of said ram to cause said ram to move along its axis relative to said main cylinder, the exterior diameter of said ram being less than the interior diameter of said main cylinder; said compensated seal structure comprising a seal holder cylinder having seal means fixed to its interior surface; said main cylinder having a constant interior diameter, interrupted by an increased interior diameter section; said interior diameter section being disposed adjacent one of the ends of said main cylinder and being removed from the other of its ends; said seal holder cylinder disposed within said increased diameter section of said main cylinder and being retained between a shoulder which defines one end of said increased diameter section and a gland ring whereby said seal holder is fixed against tilting with respect to said main cylinder; the interior diameter of said seal holder cylinder being approximately equal to said constant interior diameter of said main cylinder, and being approximately equal to said outer diameter of said ram whereby said seal means sealably engages said outer surface of said ram; the outer diameter of said seal holder cylinder being spaced from said interior diameter of said main cylinder, thereby to define a thin annular chamber of predetermined uniform gap size surrounding said seal holder cylinder; and fluid paths for said seal holder cylinder which communicate between its inner and outer diameters whereby said high pressure fluid acting on said ram is applied to said annular chamber and reduces the differential force across the wall thickness of said seal holder cylinder when said main cylinder is pressurized.

2. The structure of claim 1 which further includes gland ring means fixing said seal holder cylinder in place; said gland ring means bolted to said end of said main cylinder and extending across the end of said seal holder cylinder; and first static seal ring means disposed between the surface of said gland ring means and said end of said seal holder cylinder; and second seal ring means disposed between the surface of said gland ring and said end of said cylinder, whereby the end of said annular chamber is sealed closed.

3. The structure of claim 2 wherein a plurality of bolts arranged on a bolt circle fix said gland ring means to said main cylinder; said bolts threadably engaging said main cylinder in a region removed from said end of said main cylinder to ensure compression of the region of said main cylinder adjacent its said end.

4. The structure of claim 3 which further includes an annular channel in said end of said main cylinder which has a diameter greater than the diameter of said bolt circle.

5. The structure of claim 1 wherein said seal means includes at least first and second seal rings.

6. The structure of claim 5 wherein said first and second seal rings are axially stacked atop one another and sealed to one another over an annular sealing line at which said seals engage one another; each of said first and second seal rings having a slot extending across its full width, thereby to permit the wrapping of said first and second seal rings into said seal holder cylinder; said slots in said first and second seal rings being angularly displaced from one another.

7. The structure of claim 5 wherein each of said seal rings is a chevron type seal.

8. The structure of claim 1 wherein said seal means includes a plurality of chevron type seals which are stacked atop one another with respective pairs of adjacent seals engaging one another over an annular ring-shaped region; each of said chevron type seals having a slot extending across its width to enable the wrapping of said chevron type seals to a cylindrical form within said seal holder cylinder; said slots of each of said chevron type seals being angularly displaced relative to one another to avoid a leakage path through said slots.

* * * * *